(12) United States Patent
Hyponen

(10) Patent No.: US 6,986,050 B2
(45) Date of Patent: Jan. 10, 2006

(54) COMPUTER SECURITY METHOD AND APPARATUS

(75) Inventor: Ari Hypponen, Degerby (FI)

(73) Assignee: F-Secure OYJ, Helsinki (FI)

( * ) Notice: Subject to any disclaimer, the term of this patent is extended or adjusted under 35 U.S.C. 154(b) by 629 days.

(21) Appl. No.: 09/975,302

(22) Filed: Oct. 12, 2001

(65) Prior Publication Data

US 2003/0074566 A1 Apr. 17, 2003

(51) Int. Cl.
*G06F 12/14* (2006.01)

(52) U.S. Cl. .................. 713/183; 713/202; 380/277
(58) Field of Classification Search ................. 380/277; 713/183–202
See application file for complete search history.

(56) References Cited

U.S. PATENT DOCUMENTS

| | | | | |
|---|---|---|---|---|
| 5,008,936 A | * | 4/1991 | Hamilton et al. ........... 380/281 |
| 5,677,952 A | * | 10/1997 | Blakley et al. ............. 713/189 |
| 5,751,812 A | * | 5/1998 | Anderson ................... 713/155 |
| 6,424,718 B1 | * | 7/2002 | Holloway .................... 380/277 |
| 6,754,820 B1 | * | 6/2004 | Scheidt et al. .............. 713/166 |
| 2004/0010701 A1 | * | 1/2004 | Umebayashi et al. ....... 713/193 |

OTHER PUBLICATIONS

"Mobile Computing Device Data Security Sub–Team Summary Report", Jul. 23, 2002, entire document, www.census-.gov/procur/www/fdca/library/mcd/7–29%20MCD_WG_ Security_subteam_report.pdf.*

McGregor, J.P., et al, "Protecting Cryptographic Keys and Computations via Virtual Secure Coprocessing", PALMS, Dept of EE, Oct. 2004, entire document.*

* cited by examiner

*Primary Examiner*—Ayaz Sheikh
*Assistant Examiner*—Ronald Baum
(74) *Attorney, Agent, or Firm*—Arent Fox PLLC

(57) ABSTRACT

A method of securing data stored on an electronic device 1, the method comprising encrypting the data using a cryptographic key derivable from or accessed using a passphrase, requiring the entry into the device of the passphrase when a user wishes to access the data, subsequently inhibiting access to the data whilst the device 1 remains active, and requiring the entry into the device of a predefined password when a user wishes to access the data, the password being different from the passphrase.

8 Claims, 3 Drawing Sheets

COMPUTER SECURITY METHOD AND APPARATUS

FIELD OF THE INVENTION

The present invention relates to a method and apparatus for securing a computer system or device and more particularly to a system and apparatus which employs password protection.

BACKGROUND TO THE INVENTION

The security of electronic data is of major concern to both individuals and organisations. There are many circumstances in which the disclosure of electronic data to an unauthorised third party can result in considerable damage or loss to the owner of the data. Apart of course from normal physical security measures, the most common way to protect data is to encrypt the data and or to "lock" access to the data using a passphrase (or password). A typical security system (for example F-Secure's Filecrypto™) might, upon installation, require a user to create a passphrase. A cryptographic hash function and/or message authentication code algorithm is applied to the passphrase to derive a cryptographic key. Alternatively, a cryptographic key may be generated separately and protected by encrypting it with the key derived from the passphrase (this makes it possible for the user to change the passphrase without requiring all of the data to be re-encrypted). When it is subsequently required to encrypt data (e.g. a data file), the cryptographic key is applied to the data using an encryption function. In order to decrypt previously encrypted data, the user must enter the passphrase. The cryptographic key is again derived from the passphrase or used to access the passphrase, and the data decrypted by applying the key to the data using an inverse transformation. As a back-up, a user may store a copy of the cryptographic key on some external storage medium (typically a floppy disk). Neither the key nor the passphrase are stored permanently on the protected computer system.

The value of a passphrase as a source for a symmetric cipher key can be measured as the amount of entropy that the password contains. For example, words constructed using the Latin alphabet have an entropy of approximately 1 bit per letter, whilst a totally random string of lowercase letters and numbers has an entropy of approximately 5 bits per letter. The following table shows that a proper password should be quite long in order to provide adequate protection against a brute force attack, i.e. an exhaustive search of all possible key values.

| Symmetric key length | Time required to break |
| --- | --- |
| 56 bits | 5 minutes |
| 80 bits | 50 years |
| 96 bits | 3 million years |
| 128 bits | $10^{16}$ years |

The times shown in the table correspond with computing performance of equipment worth of $10 million USD. In the light of ever increasing computing power and new processing techniques, a key of around 90 bits would appear to provide an adequate level of security.

The strength of the encryption process is dependent on the length and randomness of the password. To achieve the required level of security, a passphrase comprising a totally random string of lowercase letters and numbers should have a length of 18 characters. It will be apparent that the process of entering such a passphrase into a computing device is relatively laborious. As such, currently implemented systems tend to require the entry of the passphrase only when a user first turns on the device (typically once per day). At this time, the cryptographic key is generated and stored in a memory of the device. For as long as the device remains on, the key is maintained. Only when the machine is turned off or re-booted is the key deleted. All stored encrypted data may be decrypted when the machine is turned on and the password entered, and subsequently re-encrypted when the machine is turned off, or data may be decrypted and encrypted only on demand.

This mechanism works well for personal computers and the like which tend to have fixed locations and are relatively unportable. The chance of a machine being stolen during working hours is low. However, for portable computing devices, implementing the described mechanism may represent an unacceptable security risk as there is a distinct possibility that the devices may be lost or stolen when they are carried out of the office environment (or even stolen from the office given their small size) when they are in an on state. Examples of portable devices are laptop and palmtop computers, as well as PDAs and mobile telephones.

SUMMARY OF THE INVENTION

A solution to the problem outlined above is to require a user to enter the passphrase at regular intervals whilst the device is turned on. The operation of such a system might be analogous to a screensaver, i.e. after some predefined period of non-use, the device enters a standby mode in which all previously decrypted data is re-encrypted and the key deleted. To return the device to the normal operating mode, the user must enter the passphrase. The problem is that the laborious operation of entering the passphrase may need to be carried out many times a day. Users will tend to extend the predefined time period after which the standby mode is entered, perhaps to a point at which security is compromised, or turn this additional security measure off altogether. This is made more likely in the case of mobile devices as these often have only basic data entry facilities, e.g. a touch screen or a limited character keypad, making the entry of long passphrases a slow process.

In order to overcome this problem, the present invention proposes a two level authentication mechanism in which a user has both a passphrase and a shorter password or PIN. Once the device has been activated by entering the passphrase, the user may be prompted to enter the password or PIN, for example after some period of non-use.

According to a first aspect of the present invention there is provided a method of securing data stored on an electronic device, the method comprising encrypting the data using a cryptographic key derivable from or accessible using a passphrase, requiring the entry into the device of the passphrase when a user wishes to access the data, subsequently inhibiting access to the data whilst the device remains active, and requiring the entry into the device of a predefined password when a user wishes to access the data, the password being different from the passphrase.

The terms "passphrase" and "password" are not intended to limit the invention only to textual passphrases and passwords. Rather these terms are intended to cover all appropriate means of identification including, for example, graphical representations such as pictures and drawings (produced by the user or selected from a list of options), a series of screen taps made by the user on a touch screen at specific locations, spoken passwords and passphrases, biometrics such as fingerprint and retina scans recognition. Passwords and passphrases may also be generated by a user using a hardware token.

Embodiments of the present invention make it possible for a user to specify a relatively long passphrase having sufficient entropy to ensure adequate security, whilst at the same time defining a relatively short password for more frequent use, e.g. after the device has timed out. The passphrase authenticates the user and serves as a source for a cryptographic key or as a means of accessing an encryption. The password only authenticates or identifies the user, and can be similar to the passphrase, as long as it provides for easier and faster entry, e.g. it can be a numeric PIN code, a handwritten signature, or identification through a biometric device or hardware token.

The cryptographic key used to encrypt the data may be derived directly from the passphrase. Alternatively, the cryptographic key may be derived independently of the password, with the key being encrypted using the passphrase or using a second key derived using the passphrase and stored in the device. In this case, a passphrase entered by the user is employed to access the encrypted key.

Preferably, following inhibition of data access, the device requires that the user enter the correct password within a predefined number of attempts, e.g. one. If the user fails to enter the correct password within this number of attempts, the cryptographic key stored by the device may be deleted, and the user requested to enter the correct passphrase. The device may require that the user enter the correct passphrase within a predefined number of attempts, e.g. three. Failing this, the encrypted data may only be accessed by entering the cryptographic key into the device, e.g. from a backup source.

According to second aspect of the present invention there is provided a method of preventing unauthorised access to electronic data stored on a computer device, the method comprising:

requesting a user to input a passphrase into the device;
receiving an entered passphrase and using the passphrase to generate or access a cryptographic key;
storing the cryptographic key in a memory of the device, wherein the stored key can be used to subsequently encrypt and decrypt data on the device;
subsequently inhibiting a user from accessing data on the device after a predefined period, or after a predefined period of non-use, or after some predefined action by the user;
requesting a user to input a password into the device;
receiving the password and, only if the password corresponds to a predefined password which is different from said passphrase, allowing the user to access data on the device, otherwise continuing to inhibit a user from accessing data on the device.

According to a third aspect of the present invention there is provided apparatus for securing electronic data, the apparatus comprising:

a memory for storing encrypted and unencrypted data:
first processing means for encrypting data using a cryptographic key derivable from or accessed using a passphrase;
input means for receiving the passphrase from a user when the user wishes to access the data;
second processing means for subsequently inhibiting access to the data whilst the device remains active, and for requiring the entry into the device of a predefined password via said input means when a user wishes to access the data, the password being different from the passphrase.

The apparatus of the present invention is preferably a mobile computer device such as a laptop or palmtop computer, a PDA, or a mobile telephone.

According to a fourth aspect of the present invention there is provided a computer storage medium having stored thereon a program for causing a computer device to secure data stored on the electronic device by:

encrypting the data using a cryptographic key derivable from or accessed using a passphrase, requiring the entry into the device of the passphrase when a user wishes to access the data, subsequently inhibiting access to the data whilst the device remains active, and requiring the entry into the device of a predefined password when a user wishes to access the data, the password being different from the password.

DETAILED DESCRIPTION OF CERTAIN EMBODIMENTS

Figure 1:
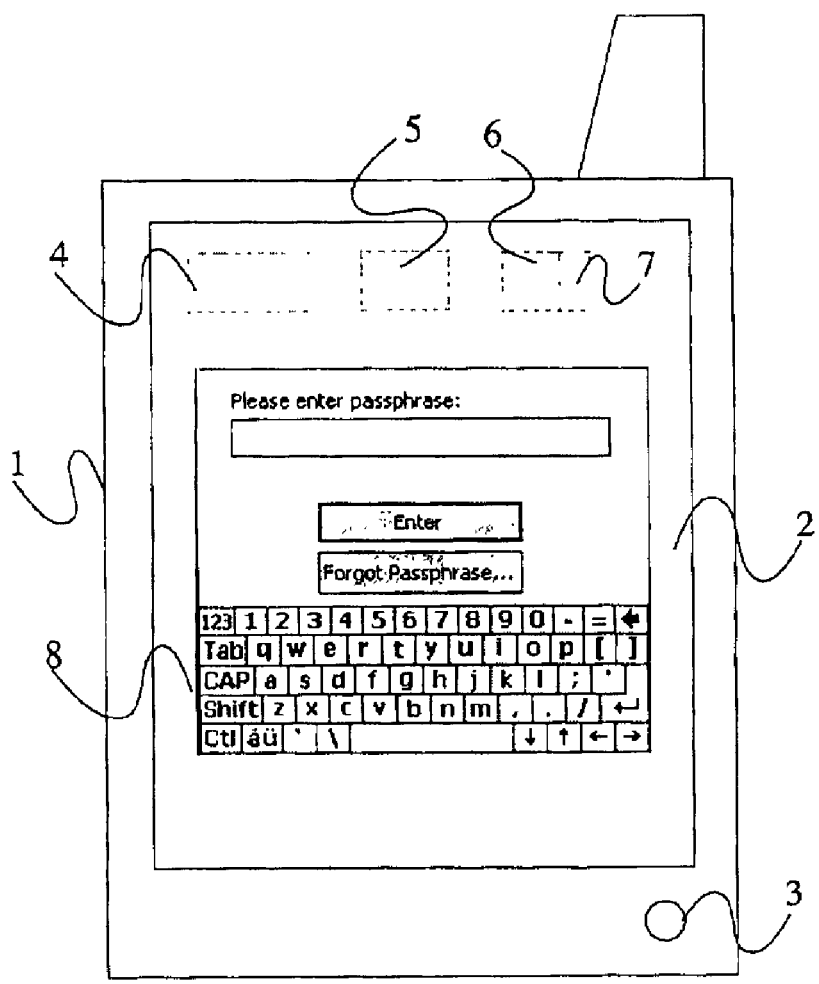
FIG. 1 illustrates schematically a mobile computer device.

There is illustrated in FIG. 1 a mobile computing device 1 which, in this example, is a personal digital assistant (PDA). The PDA has a large display screen 2 which is touch sensitive to provide a mechanism for entering data into the device. The device 1 also has an on/off button 3 for turning the device on and off. The PDA 1 includes mobile (cellular) telephone functionality, e.g. GSM or third generation (e.g. 3G). The PDA 1 comprises a microprocessor 4, a ROM memory 5, and a RAM memory 6. Part of the RAM memory is allocated to provide a cache memory 7.

The RAM 6 is arranged to store both program files and user data. Stored in the RAM 6 (or possibly the ROM 5) is program code for encrypting data, typically user data files such as text files, images, contacts, spreadsheets, etc, and which is run by the microprocessor 4 using the cache memory 7. The program may use an algorithm such as DES, Triple DES, AES or RSA, and makes use of a cryptographic key generated by applying a hash function and/or message authentication code algorithm to a passphrase supplied by a user of the device. To ensure adequate security, the passphrase should be a string of at least 18 alphanumeric characters (although a user may select fewer characters if he or she is willing to accept a lower level of security). The passphrase is first entered into the device when the encryption application is installed into the device (or when it is first activated if the encryption application is pre-installed into the PDA 1).

The user is prompted to save a back-up copy of the cryptographic key in case the passphrase is later lost or forgotten. The key may be presented to the user on the display so that he can write it down on paper, or may be output electronically to some external device. Alternatively or in addition a copy of the key may be sent to the user's mobile network operator for safe storage (e.g. in an SMS text message) or via the operator to some third party (e.g. the vendor of the encryption application).

During installation or initialisation, the user is also asked to enter a short password which may be for example a four digit numerical PIN. The password is stored securely in the RAM 6, encrypted using the passphrase or cryptographic key. The purpose of the password will be explained below, but it is noted here that the password can be entered easily and quickly into the PDA as compared to the passphrase.

When the PDA 1 is turned on using the on/off button 3 (following earlier installation of the encryption application into the PDA) and the device boots up, the user is prompted on the display 3 to enter his chosen passphrase, e.g. using the graphic 8 shown on the display 2 in FIG. 1. An alphanumeric keypad may be displayed with which the user can "tap" out the passphrase. When the passphrase is entered (e.g. using the touch sensitive display), a corresponding cryptographic key generated using the passphrase. The authenticity of the key and passphrase are confirmed by the ability of the key decrypt previously encrypted data (or by calculating a cryptographic checksum of the passphrase or the cryptographic keys with a hash function, and comparing that result with a similar checksum stored previously on the system). The key is securely stored in the RAM 6 and the passphrase deleted from the memory. At this stage, all encrypted data stored in the RAM 6 may be decrypted using the key. When the PDA is subsequently turned off, the data is re-encrypted. However, for security and processing reasons it may be preferable to decrypt and encrypt data only on demand or request. That is, when a user requests access to particular data, the data is decrypted and is stored temporarily in the cache memory 7. If the data is amended and a request is made by the user to save the data, the data is re-encrypted and written to the RAM 6. Other data remains encrypted throughout this process.

If the encryption application detects that the PDA 1 has been unused for some predefined period of time, it causes the PDA to enter an idle mode, whereupon the display 2 goes blank and any device input/output ports are locked. If the user attempts to activate the PDA 1, e.g. by tapping the touch sensitive display, a message is displayed on the display 2 prompting the user to enter the short password. A numerical keypad is also displayed. A password entered by the user is compared against the stored (encrypted) password. If it has been entered correctly, the encryption application causes the PDA to enter the normal active mode again in which the user can access and decrypt encrypted data and use other functions of the PDA 1. If the user has not entered the correct password, he may or may not be given a limited number of further opportunities. If the correct password is not entered on the first (or subsequent) attempt, the application deletes the stored cryptographic key thereby locking the encrypted data.

A new message is displayed prompting the user to enter the longer passphrase that will now be required in order to recreate the cryptographic key in memory and access the data. If the passphrase is entered correctly, the cryptographic key is recreated and the encryption application causes the PDA to enter the normal active mode again. If the user cannot reproduce the correct passphrase during a limited number of opportunities, a new message is displayed prompting the user to enter the complete cryptographic key which the user should have saved as a backup. The user may enter this manually using the touch sensitive display 2, or may enter it electronically via an input port of the device (e.g. serial, IR, Bluetooth®, etc), or may retrieve it from his mobile network operator. If the key cannot be provided, recovery of encrypted data may not be possible.

Figure 2:
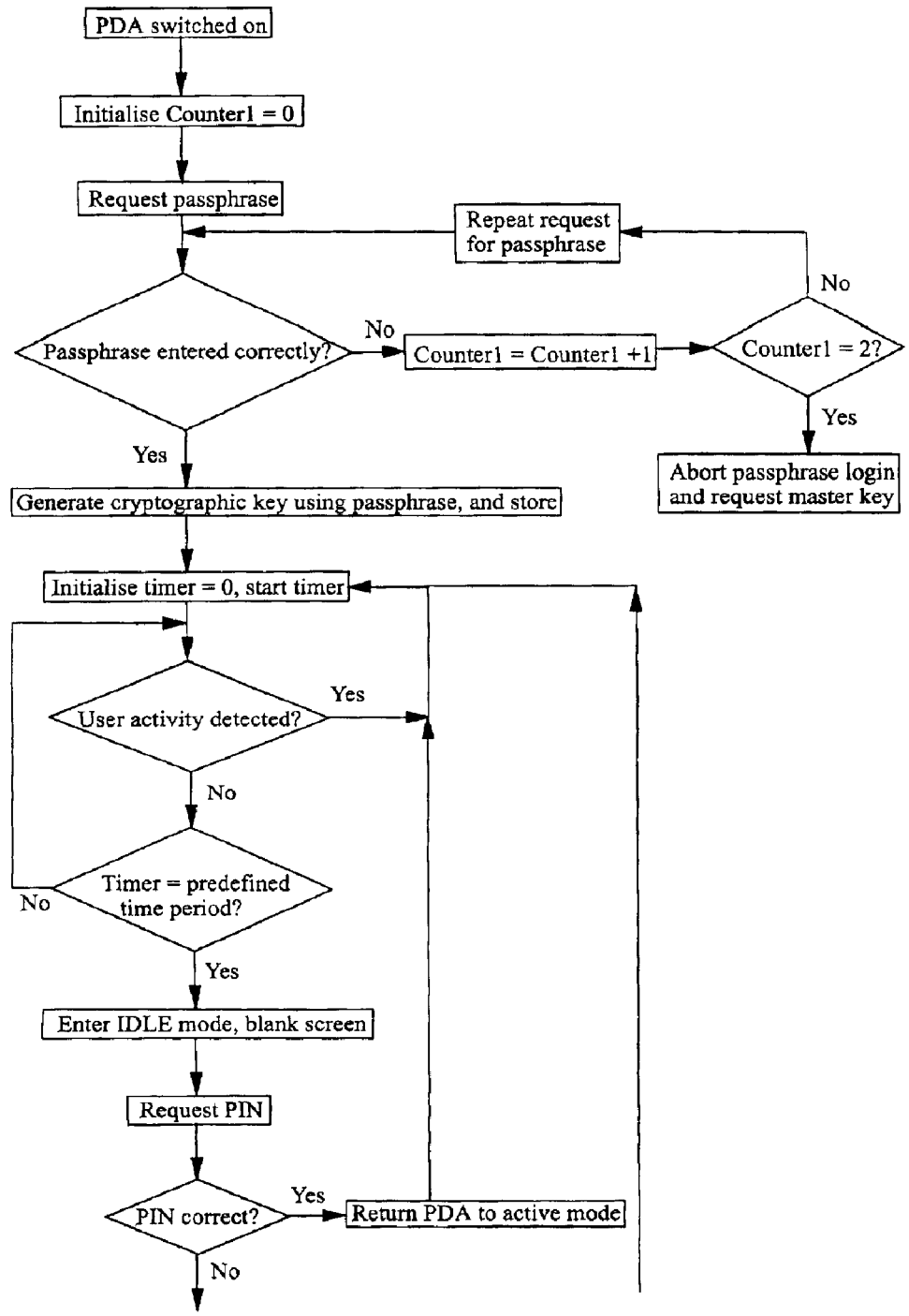
FIG. 2 is a flow diagram illustrating a method of securing data on the device of FIG. 1.
Figure 2:
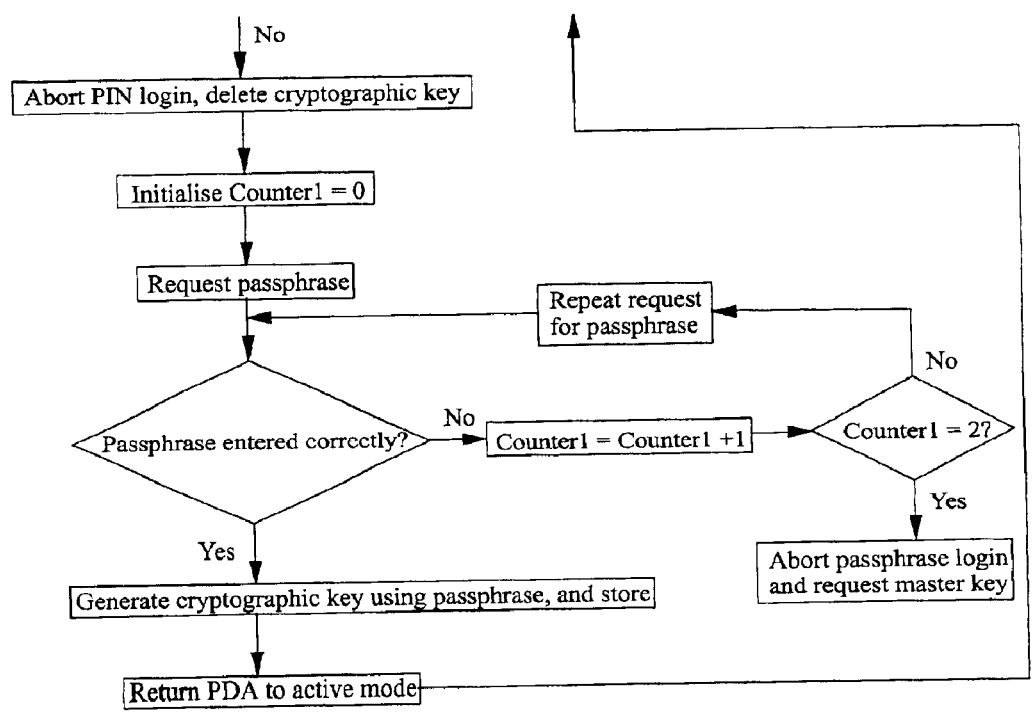

The method described above is further illustrated by the flow diagram of FIG. 2.

It will be appreciated by the person of skill in the art that various modifications may be made to the above described embodiment without departing from the scope of the present invention. For example, after extended periods of use (e.g. one day), the user may be prompted to enter the long passphrase even if the device has not been turned off in the meantime. This further increases the level of security. In another modification, the protection afforded by the passphrase and password may apply only to designated or encrypted data. That is, if a user enters the incorrect passphrase or password, or does not know these, he may still be able to access the normal functions of the device (e.g. to make a phone call) but will not be able to access the encrypted data.

What is claimed is:

1. A method of securing data stored on an electronic device, the method comprising:
   encrypting the data using a cryptographic key
      derivable from or
      accessed using a passphrase;
   requiring the entry into the device of the passphrase when a user wishes to access the data;
   subsequently inhibiting access to the data whilst the device remains
      active and
      powered up; and
   requiring the entry by the user into the device of a predefined password when a user wishes to access the data following inhibition of data access, the password being different from the passphrase,
   wherein, if the user fails to enter the correct password within a predefined number of attempts, the cryptographic key stored by the device is
   deleted or
   re-encrypted.

2. A method according to claim 1, wherein, in the event that the user fails to enter the correct password within a predefined number of attempts, the user is requested to reenter the correct passphrase.

3. A method according to claim 2, wherein, if the correct passphrase is not reentered by the user following failure by the user to enter the correct password, the encrypted data may only be accessed by entering the cryptographic key into the device.

4. A method according to claim 1 and comprising storing the predefined password in a memory of the device following encryption with said password or said cryptographic key, and verifying the password entered by the user by comparing it with the stored password.

5. A method of preventing unauthorised access to electronic data stored on a computer device, the method comprising:
   requesting a user to input a passphrase into the device;
   receiving an entered passphrase and using the passphrase to generate or access a cryptographic key;
   storing the cryptographic key in a memory of the device, wherein the stored key can be used to subsequently encrypt and decrypt data on the device;
   subsequently inhibiting a user from accessing data on the device after a predefined period, or after a predefined period of non-use, or after some predefined action by the user;
   requesting a user to input a password into the device; and
   receiving the password and, only if the password corresponds to a predefined password which is different from said passphrase, allowing the user to access data on the device, otherwise deleting or re-encrypting the cryptographic key.

6. Apparatus for securing electronic data, the apparatus comprising:
- a memory for storing encrypted and unencrypted data;
- first processing means for encrypting data using a cryptographic key
  - derivable from or
  - accessed using a passphrase;
- input means for receiving the passphrase from a user when the user wishes to access the data; and
- second processing means for subsequently inhibiting access to the data whilst the device
  - remains
    - active and
    - powered up,
- for requiring the entry into the device by the user of a predefined password via said input means when a user wishes to access the data, the password being different from the passphrase, and
- for causing the cryptographic key stored by the device to be
  - deleted or
  - re-encrypted if the user fails to enter the correct password within a predefined number of attempts.

7. Apparatus according to claim 6, the apparatus being a mobile computer device such as a laptop or palmtop computer, a PDA, or a mobile telephone.

8. A computer storage medium having stored thereon a program for causing a computer device to secure data stored on the electronic device by:
- encrypting the data using a cryptographic key
  - derivable from or
  - accessed using a passphrase,
- requiring the entry into the device of the passphrase when a user wishes to access the data,
- subsequently inhibiting access to the data whilst the device
  - remains
    - active and
    - powered up, and
- requiring the entry by the user into the device of a predefined password when a user wishes to access the data, the password being different from the passphrase, and,
- in the event that the user fails to enter the correct password within a predefined number of attempts,
  - deleting or
  - re-encrypting the cryptographic key stored by the device.

* * * * *